Patented Feb. 23, 1932

1,846,264

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCING VAT DYESTUFFS

No Drawing. Application filed January 11, 1928, Serial No. 246,078, and in Germany January 14, 1927.

We have found that new nitrogen-containing vat dyestuffs are obtained if an anthrone radical combination which contains at least one negative substituent is brought into reaction with such a nitrogen compound as contains at least still one reactive hydrogen atom on the nitrogen atom. The expression "anthrone radical combination" where ever used in this specification including the appended claims, is meant to comprise ms-benzdianthrones, ms-naphthodianthrones, allo-ms-naphthodianthrones, ms-anthradianthrones, dibenzanthrones and isodibenzanthrones. Accordingly the said anthrone radical combinations are compounds containing one of the following ring systems:

at least one reactive hydrogen atom on the nitrogen atom which may be condensed with the said anthrone radical combinations, aminoanthraquinones and their derivatives are particularly suitable, since the introduction of the anthraquinonylamine radicle substantially faciliates the vatting of the new dyestuffs. The condensation may also be effected with ammonia, carbazol, isatine, toluenesulphamide and other nitrogenous compounds of the kind specified. The reaction is preferably carried out in solvents or suspension agents of high boiling point, such as nitrobenzene, naphthalene, and the like, and in the presence of catalysts such as copper or copper compounds or of acid-fixing agents,

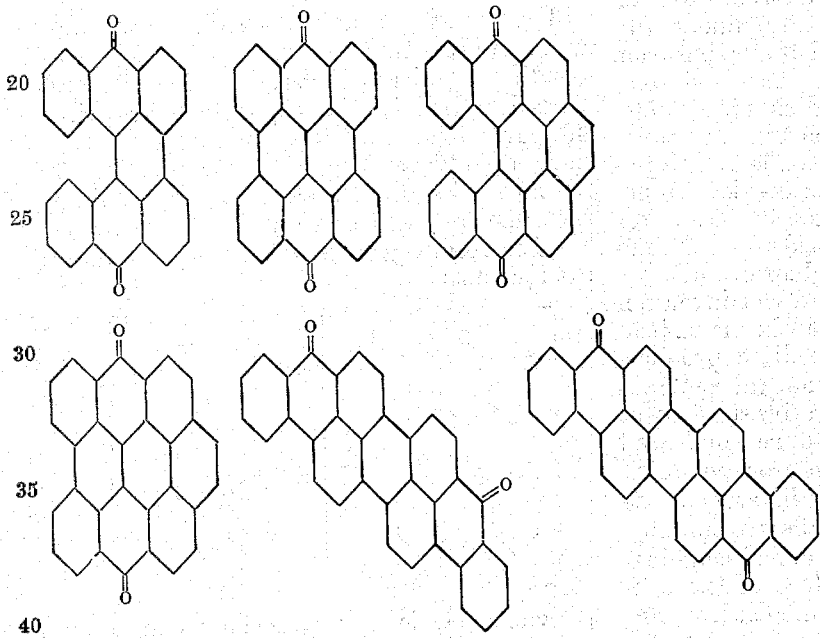

The anthrone radical combinations may be substituted by any negative substituents such as halogen atoms or nitro groups and the like. As nitrogenous compounds containing or both. In most cases it proceeds quantitatively.

Depending on the working conditions adopted, the halogen atoms in those of the said anthrone radical combinations, which contain several halogen atoms, may be wholly or partially replaced by the nitrogenous radicle, and the resulting products give exceedingly fast brown-yellow or grey to blue-black or violet-black dyeings on cotton from brown or blue to brown-violet or bluish-violet vats.

Analogous dyestuffs are also obtained by condensing intermediate products containing at least one negative substituent, which intermediate products on further condensation yield the said anthrone radical combinations, with a nitrogenous compound containing at least one reactive hydrogen atom on the nitrogen atom and then further condensing the reaction products to dyestuffs containing one of the above described ring systems. As intermediate products of the said kind may be mentioned dianthraquinonyls, dibenzanthronyls, or 2.2'-dimethyl-ms-benzdianthrones containing a negative substituent. Those of the said dyestuffs which contain more than one linking ring between the anthrone radicals may also be produced when further condensing the dyestuffs obtained from anthrone radical combinations containing a smaller number of linking rings such as those derived from ms-naphthodianthrones allo-ms-naphthodianthrones or ms-anthradianthrones in the manner described in our copending application for patent Ser. No. 199,420. Thus, for instance, a dyestuff similar to tri-aminoanthraquinonyl-ms-naphthodianthrone obtainable from tribrom-ms-naphthodianthrone, and an amino-anthraquinone can be obtained by condensing the reaction product between tribrom-ms-benzdianthrone and an amino-anthraquinone with aluminium chlorid. Instead of starting from tribrom-ms-benz-dianthrone also tribrom-anthraquinonyl may be used as initial material which after condensation with an amino-anthraquinone may be first condensed to tri-amino-anthraquinonyl-ms-benz-dianthrones and the latter then condensed by means for instance of aluminium chlorid to tri-amino-anthraquinonyl-ms-naphthodianthrone.

For the purposes of the present invention it is not necessary that the anthrone radical combinations or the intermediate products leading to the formation of the said combinations are substituted by a negative substituent and the other compound to be condensed therewith contain a nitrogen atom to which at least one reactive hydrogen atom is attached, but analogous dyestuffs are obtained when condensing anthrone radical combinations or the said intermediate products containing a nitrogen atom to which at least one reactive hydrogen atom is attached, with another compound which is substituted by at least one negative substituent.

The following examples will further illustrate the nature of this invention but the invention is not limited to these examples. The parts are by weight.

Example 1

7 parts of tetrabrom-ms-benzdianthrone (see Berichte der Deutschen Chemischen Gesellschaft, vol. 43, p. 1734) are stirred and boiled for 15 hours in 100 parts of nitrobenzene, with 5 parts of sodium acetate, 8.8 parts of α-aminoanthraquinone and 1.5 parts of basic copper carbonate. After cooling, the residue is filtered and boiled with water, leaving behind the dyestuff corresponding to the formula:

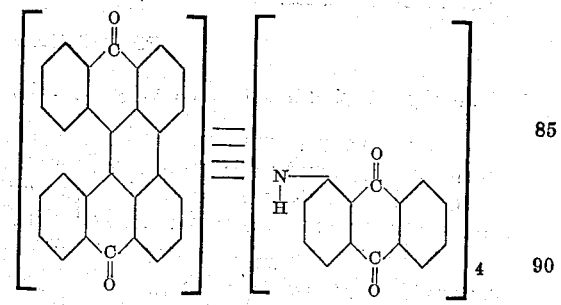

in the form of a violet powder, free from halogen which gives a violet solution in concentrated sulfuric acid and furnishes a brownish-violet vat with an alkaline hydrosulfite solution. In contrast to the very weak orange shades obtained with tetrabrom-ms-benzdianthrone, the dark violet dyeings on cotton are very fast to light.

Example 2

31 parts of tribrom-ms-benzdianthrone obtainable according to Example 2 of the copending application Ser. No. 199,421, are stirred and boiled for about 12 hours with 40 parts of α-aminoanthraquinone in 300 parts of nitrobenzene, after the addition of 20 parts of sodium acetate. After cooling, the same treatment is applied as in Example 1. The resulting dyestuff corresponding to the formula:

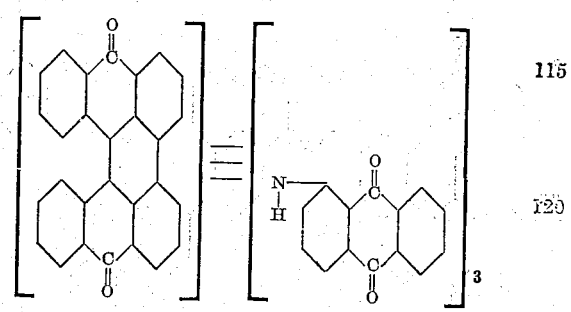

is a violet powder giving a violet solution in concentrated sulfuric acid, a brownish-violet vat, and strong violet dyeings on cotton.

Example 3

6.2 parts of tribrom-ms-benzdianthrone are dissolved in 100 parts of nitrobenzene, 7.5 parts of 1-amino-4-methoxy-anthraquinone, 5 parts of sodium acetate and 0.5 part of copper carbonate being added, and the whole gently boiled, while stirring, for about 24 hours. After cooling and filtering, the residue is boiled with water and dried, leaving the dyestuff corresponding to the formula:

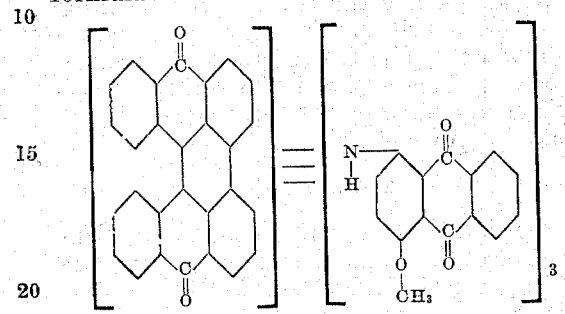

in the form of a blue-black powder which is free from halogen, dissolves to a blue-green solution in concentrated sulfuric acid, and gives greyish-blue dyeings on cotton from a brownish-violet vat.

*Example 4*

A solution of 4.85 parts of trichlor-ms-benzdianthrone obtainable according to Example 3 of the copending application Ser. No. 199,421, in 100 parts of nitrobenzene, is boiled for 6 hours with the addition of 4.6 parts of α-aminoanthraquinone, 5 parts of sodium acetate and 1.5 parts of copper carbonate, and treated in the usual manner. The resulting violet powder still contains halogen. It gives a violet solution with concentrated sulfuric acid, and violet dyeings on cottom from a brown vat.

*Example 5*

6.2 parts of tribrom-ms-benzdianthrone, 6.6 parts of β-aminoanthraquinone, 5 parts of sodium acetate and 0.5 part of copper carbonate are stirred and boiled in 100 parts of nitrobenzene for about 12 hours, the reaction product being boiled with water, after cooling and filtration. It gives a blue solution in concentrated sulfuric acid, a brownish-red vat, and very fast copper-red dyeings on cotton.

*Example 6*

47 parts of 4.4′-dichlor-2.2′-dimethyl-ms-benzdianthrone obtainable by reducing 4.4′-dichlor-2.2′-dimethyl-1.1′-dianthraquinonyl in acid solution, in 1000 parts of nitrobenzene are stirred and boiled for about 12 hours with 25 parts of sodium acetate, 1.5 parts of copper carbonate and 46 parts of α-aminoanthraquinone, and treated in the usual manner. The resulting dyestuff is obtained in the form of a violet powder which dissolves to a greenish-yellow solution in concentrated sulfuric acid and gives violet dyeings on cotton from a brown vat.

*Example 7*

62 parts of tribrom-ms-naphthodianthrone, obtainable from tribrom-ms-benzdianthrone by heating with aluminium chlorid, are stirred and boiled for about 6 hours in 2000 parts of nitrobenzene with 65 parts of α-aminoanthraquinone, 50 parts of sodium acetate and 5 parts of copper carbonate. The deposit is filtered by suction, boiled with water and dried. The resulting violet powder, which still contains halogen, gives a brownish-red solution in concentrated sulfuric acid, a brown vat, and extremely fast reddish-violet dyeings on cotton.

A dyestuff of almost equal properties is obtained when condensing the dyestuff obtained according to Example 2 with aluminium chlorid.

*Example 8*

18 parts of the tetrabrom-ms-naphthodianthrone obtainable by treating tetrabrom-ms-benzdianthrone with aluminium chlorid, are stirred and boiled for about 12 hours with 20 parts of α-aminoanthraquinone and 10 parts of sodium acetate in 350 parts of nitrobenzene, and treated as specified in Example 7. The resulting dyestuff, a violet powder, gives very fast red-violet dyeings on cotton from a brown vat.

*Example 9*

A suspension of 35 parts of tetrabrom-ms-napthodianthrone, obtainable from tetrabrom-ms-benzdianthrone and aluminium chlorid, 50 parts of β-aminoanthraquinone, 23 parts of sodium acetate and 2 parts of copper carbonate, is stirred and boiled for about 24 hours in 500 parts of nitrobenzene, and treated as described in Example 7. The resulting dyestuff, a brownish-yellow powder, gives a violet solution in concentrated sulfuric acid, and yellow-brown dyeings on cotton from a brownish-violet vat.

*Example 10*

50 parts of dichlor-ms-naphthodianthrone, obtainable by chlorinating ms-naphthodianthrone, are stirred and boiled for about 8 hours in 1000 parts of nitrobenzene with 45 parts of α-aminoanthraquinone, 25 parts of sodium acetate and 2.5 parts of copper carbonate, and treated in the usual manner. The dyestuff is obtained in the form of a violet powder, which is free from halogen, dissolves to a violet solution in concentrated sulfuric acid, and furnishes a brownish-red vat from which claret dyeings are obtained on cotton.

*Example 11*

A suspension of 30 parts of brom-2.2′-dimethyl-ms-naphthodianthrone, obtainable by treating 2.2'-dimethyl-ms-naphthodianthrone (which may be obtained by treatment of 2.2'-dimethyl-ms-benzdianthrone with aluminium chlorid) with bromine, 50 parts of 1-amino-4-methoxyanthraquinone, 20 parts of sodium acetate and 3.5 parts of copper carbonate, in 1000 parts of nitrobenzene, is stirred and boiled for about 24 hours, and treated in the usual manner. The greenish-black crude product dissolves to a violet solution in concentrated sulfuric acid, and gives powerful olive green dyeings on cotton from a brown vat.

The product obtainable from tetrabrom-ms-naphthodianthrone and 1-amino-4-methoxyanthraquinone in a similar manner, dissolves to a blue solution in concentrated sulfuric acid, and gives dark blue dyeings from a brown vat.

Example 12

7.2 parts of tetrabrom-allo-ms-naphthodianthrone obtainable according to Example 19 of the copending application Ser. No. 199,420, are stirred and boiled for about 6 hours in 70 parts of nitrobenzene with 5 parts of sodium acetate, 0.3 part of copper carbonate and 4.4 parts of $\alpha$-aminonanthraquinone. After cooling, the deposit is filtered by suction, boiled with water and dried. The resulting dark blue powder, which contains halogen, gives a green solution with concentrated sulfuric acid, brownish-violet vats and very fast dark navy blue dyeings on cotton.

Example 13

A solution of 30 parts of dibrom-allo-ms-naphthodianthrone obtainable according to Example 17 of the copending application Ser. No. 199,420, and 30 parts of $\alpha$-aminoanthraquinone in 250 parts of nitrobenzene is treated with 20 parts of sodium acetate and boiled, while stirring, for about 12 hours, the deposit being filtered by suction after cooling and treated as in Example 12. The resulting dark blue powder gives a green solution in concentrated sulfuric acid, and dark navy blue dyeings on cotton from a brownish-violet vat.

Example 14

4.75 parts of dichlor-allo-ms-naphthodianthrone, the dyestuff obtainable according to Example 15 of the copending application Ser. No. 199,420, 5 parts of 1-amino-4-methoxyanthraquinone, 3 parts of sodium acetate and 0.3 part of copper carbonate are suspended in 50 parts of nitrobenzene, and boiled while stirring, for about 12 hours, the product being then filtered by suction in the cold and treated in the usual manner. The resulting dyestuff gives a green solution in concentrated sulfuric acid, violet vats and powerful and very fast black dyeings on cotton.

Example 15

A solution of 5 parts of dichlor-allo-ms-naphthodianthrone in 80 parts of nitrobenzene is stirred and boiled during 18 hours with the addition of 5 parts of $\beta$-aminoanthraquinone, 5 parts of sodium acetate and 0.5 part of copper carbonate. After cooling, the residue is filtered by suction and boiled with water. The brown reaction product gives a green solution in concentrated sulfuric acid, and copper red-dyeings on cotton from a deep violet vat.

Example 16

47 parts of dichlor-allo-ms-naphthodianthrone are stirred and boiled during 12 hours in 500 parts of nitrobenzene with 3 parts of sodium acetate, 2.5 parts of copper carbonate and 5 parts of p-toluene-sulfamide. After cooling and filtering, the deep violet residue is dissolved in concentrated sulfuric acid at 80° to 100° centigrade and precipitated therefrom by dilution. The resulting di-amino-allo-ms-naphthodianthrone is a violet powder, which gives a green solution with concentrated sulfuric acid, and violet dyeings, fast to chlorine on cotton from a violet vat.

The same dyestuff is obtained when bringing dichlor-allo-ms-naphthodianthrone to reaction with ammonia.

The di-amino-allo-ms-naphthodianthrone can of course be further condensed with compounds containing a negative substituent such as, for instance, 1-chlor-4-methoxy-anthraquinone and a dyestuff is obtained with similar coloring properties as the dyestuff obtained according to Example 14.

Example 17

47.5 parts of dichlor-allo-ms-naphthodianthrone are boiled while stirring, for 15 hours in 475 parts of nitrobenzene with 25 parts of sodium acetate, 0.5 part of copper carbonate and 49 parts of 1.5-diamino-anthraquinone. The reaction product is worked up as described in Example 1; it gives a green solution in concentrated sulfuric acid and dyes cotton violet-black shades of excellent fastness especially to chlorine from a brown-violet vat.

Example 18

36 parts of tetrabrom-allo-ms-napththodianthrone are stirred and boiled during 6 hours in 720 parts of nitrobenzene with 48 parts of 1-amino-2-methyl-anthraquinone, after the addition of 25 parts of sodium acetate and 2.5 parts of copper carbonate, and are then treated in the usual manner. The resulting dyestuff, a dark blue powder, gives violet vats and dark blue dyeings on cotton.

Example 19

56 parts of dibrom-ms-anthradianthrone, obtainable according to Example 25 of the copending application Ser. No. 199,420, are stirred and boiled during 12 hours with 46 parts of α-aminoanthraquinone and 25 parts of sodium acetate in 1000 parts of nitrobenzene. After cooling and filtering by suction the residue is boiled with water, again filtered and dried. The resulting brownish-violet dyestuff gives a blue solution with concentrated sulfuric acid and very fast deep violet dyeings on cotton from a brownish-violet vat.

The same dyestuff is also obtained when further condensing the dyestuff produced according to Example 13 with the aid of oxidizing agents or aluminum chlorid.

Example 20

47 parts of chlor-ms-anthradianthrone, obtainable according to Example 20 of the copending application Ser. No. 199,420, are suspended in 500 parts of nitrobenzene, treated with an addition of 44 parts of β-amino-anthraquinone, 20 parts of sodium acetate and 6 parts of copper carbonate, and boiled while stirring, for about 10 hours and are then treated in the usual manner. The reaction product is a brown powder, which dissolves to a blue solution in concentrated sulfuric acid and gives powerful brown dyeings on cotton from a brown vat.

Example 21

28 parts of dibrom-ms-anthradianthrone, are stirred and boiled for 12 hours with 25 parts of 1-amino-4-methoxy-anthraquinone, 15 parts of sodium acetate and 1 part of copper oxid, in 250 parts of nitrobenzene. Treatment in the usual manner leaves the resulting dyestuff in the form of a bluish-violet powder, which gives a blue solution in concentrated sulfuric acid and very fast greyish-blue dyeings on cotton from a brown vat.

Example 22

36 parts of tetrabrom-ms-anthradianthrone, obtainable by heating tetrabrom-allo-ms-naphthodianthrone with aluminium chlorid, are stirred and boiled for 20 hours in 400 parts of nitrobenzene with 50 parts of p-toluene-sulfamide, 2 parts of copper carbonate and 25 parts of sodium acetate, and after cooling are treated as described in Example 19. The residual deep violet powder, is dissolved in concentrated sulfuric acid at 90° to 100° centigrade and precipitated from the solution by dilution, whereupon the diamino-ms-anthradianthrone is obtained as a violet paste. It gives violet dyeings on cotton from a brownish-violet vat.

An analogous product is obtained when treating ms-anthradianthrone with nitrating agents and reducing the nitro-compound in the usual manner, for instance, with sodium sulfid.

Example 23

12.5 parts of dibrom-dibenzanthrone obtainable by brominating dibenzanthrone in chlor-sulfonic acid in the presence of sulfur are boiled for 13 hours, while stirring, in a mixture of 250 parts of nitrobenzene, 2.5 parts of copper carbonate, 10 parts of sodium carbonate and 10 parts of 1-amino-anthraquinone; the reaction product is filtered off by suction, while hot, and is then boiled with water and dilute acid for removing inorganic constituents, and dried after filtration. The black powder obtained gives a blue solution with concentrated sulfuric acid and grey to blue-black dyeings of excellent fastness on cotton from a blue vat.

Example 24

11 parts of dichlor-dibenzanthrone obtainable by chlorinating dibenzanthrone in chlor-sulfonic acid in the presence of sulfur are suspended in 100 parts of nitrobenzene; 5 parts of sodium acetate, 1.5 parts of copper carbonate and 5 parts of 1.4-amino-methoxy-anthraquinone are added and the mixture is boiled for 20 hours while stirring. The reaction product is filtered off by suction while hot and worked up as described in Example 23. The black powder so obtained dyes cotton from a green-blue vat blue-grey to blue-black shades of excellent fastness and dissolves to a blue solution in concentrated sulfuric acid.

Example 25

62 parts of dibrom-isodibenzanthrone obtainable by brominating isodibenzanthrone in nitrobenzene are boiled for 15 hours while stirring in a mixture of 1000 parts of nitrobenzene, 30 parts of sodium acetate, 2 parts of copper carbonate, 5 parts of cupric oxid and 50 parts of 1.4-amino-methoxy-anthraquinone. The reaction product is filtered off by suction while hot and worked up as described in Example 23. The grey-black powder obtained dyes cotton violet-grey shades of excellent fastness from a green-blue vat and gives blue solutions in concentrated sulfuric acid.

What we claim is:

1. As new articles of manufacture ms-benzdianthrones to which at least one other organic radical is attached by nitrogen linkage.

2. As new articles of manufacture ms-benzdianthrones to which at least one anthraquinonyl radical is attached by nitrogen linkage.

3. As new articles of manufacture ms-benzdianthrones to which at least one anthraquinonyl radical is attached in the α-position by nitrogen linkage.

4. As a new article of manufacture the dyestuff corresponding to the formula:

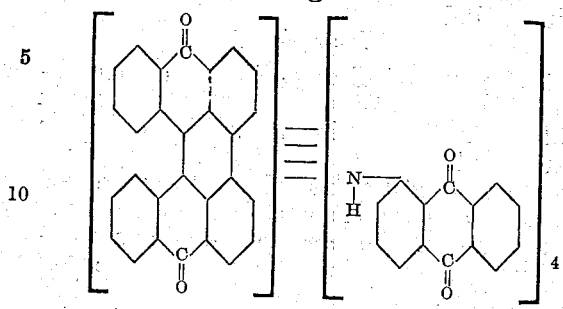

forming a violet powder, free from halogen giving a violet solution in concentrated sulfuric acid and dyeing cotton dark violet shades very fast to light from a brownish violet vat.

5. The process of producing new vat dyestuffs which comprises condensing a ms-benzdianthrone with a compound, one of the said components containing at least one halogen atom, the other at least one reactive hydrogen atom attached to a nitrogen atom in a diluting medium of high boiling point in the presence of a condensing catalyst containing copper and an acid-fixing agent.

6. The process of producing new vat dyestuffs which comprises condensing a halogenated ms-benzdianthrone with a nitrogenous compound containing at least one reactive hydrogen atom on a nitrogen atom in a diluting medium of high boiling point in the presence of a condensing catalyst containing copper and an acid-fixing agent.

7. The process of producing new vat dyestuffs which comprises condensing a halogenated ms-benzadianthrone with a nitrogenous compound containing at least one reactive hydrogen atom on a nitrogen atom in a diluting medium of high boiling point in the presence of a condensing catalyst containing copper and an acid-fixing agent.

8. The process of producing new vat dyestuffs which comprises condensing a halogenated ms-benzdianthrone with a nitrogenous compound containing at least one reactive hydrogen atom on a nitrogen atom in a diluting medium of high boiling point in the presence of a condensing catalyst containing copper and an acid-fixing agent.

9. The process of producing new vat dyestuffs which comprises condensing a halogenated ms-benzdianthrone with a nitrogenous compound containing at least one reactive hydrogen atom on a nitrogen atom in a diluting medium of high boiling point in the presence of a condensing catalyst containing copper and an acid-fixing agent.

10. The process of producing new vat dyestuffs which comprises condensing a halogenated ms-benzdianthrone with a nitrogenous compound containing at least one reactive hydrogen atom on a nitrogen atom in a diluting medium of high boiling point in the presence of a condensing catalyst containing copper and a salt of an alkali metal and a weak acid.

11. The process of producing new vat dyestuffs which comprises condensing a halogenated ms-benzdianthrone with an aminoanthraquinone in a diluting medium of high boiling point in the presence of a condensing catalyst containing copper and an acid-fixing agent.

12. The process of producing new vat dyestuffs which comprises condensing a halogenated ms-benzdianthrone with an α-aminoanthraquinone in a diluting medium of high boiling point in the presence of a condensing catalyst containing copper and an acid-fixing agent.

13. The process of producing a new vat dyestuff which comprises condensing about one molecular proportion of tetrabrom-ms-benzdianthrone with about 4 molecular proportions of α-amino-anthraquinone in a diluting medium of high boiling point in the presence of a condensing catalyst containing copper and an acid-fixing agent.

In testimony whereof we have hereunto set our hands.

MAX ALBERT KUNZ.
KARL KÖBERLE.